United States Patent

[11] 3,572,635

| [72] | Inventor | Andre Emile Evariste Desplats<br>Boulogne-Billancourt, France |
|---|---|---|
| [21] | Appl. No. | 836,318 |
| [22] | Filed | June 25, 1969 |
| [45] | Patented | Mar. 30, 1971 |
| [73] | Assignee | Tractel S.A.<br>Paris, France |
| [32] | Priority | June 27, 1968 |
| [33] | | France |
| [31] | | 156 882 |

[54] RELEASE CONTROL AND SAFETY DEVICE FOR CLAMP-TYPE TRACTION AND HOISTING APPARATUS
1 Claim, 3 Drawing Figs.

[52] U.S. Cl. ................................................ 254/76, 254/106
[51] Int. Cl. ...................................................... B66f 3/00
[50] Field of Search .......................................... 254/76, 105—107; 24/134

[56] References Cited
UNITED STATES PATENTS

| 2,585,101 | 2/1952 | Faure | 254/76 |
| 3,222,742 | 12/1965 | Persiaux | 254/76X |
| 3,237,920 | 3/1966 | Dohmeier | 254/76X |
| 3,485,478 | 12/1969 | Desplats | 254/106 |

Primary Examiner—Robert C. Riordon
Assistant Examiner—David R. Melton
Attorney—Linton and Linton ABSTRACT: The release control device comprises a manually movable release control lever and a latching element adapted in the normal position to prevent the actuation of the release control device, the latching element being automatically returned to its normal position by spring means and comprising actuating means which cannot be actuated by the same hand of the operator simultaneously with the release control member, in order that the release of the apparatus necessitates the simultaneous action of the two hands of the operator on the release control member and on the latching element.

Patented March 30, 1971

3,572,635

INVENTOR
ANDRÉ EMILE EVARISTE DESPLATS

By Linton and Linton
ATTORNEYS

RELEASE CONTROL AND SAFETY DEVICE FOR CLAMP-TYPE TRACTION AND HOISTING APPARATUS

Traction and hoisting apparatus of the type acting on a cable or rope by means of clamps are already known, in which the release mechanism is adapted to prevent an erroneous actuation of the release lever from releasing the cable and thus permit the backward movement or the fall of the load when the latter is relatively moderate. Such traction and hoisting apparatus and their release mechanisms are particularly described in the U.S. Pat. application No. 676,940, filed on Oct. 10, 1967 now U.S. Pat. No. 3,485,478.

It is the essential object of the present invention to provide an increased safety in case of accidental actuation of the release lever of apparatus of this type by combining the release mechanism disclosed in the above mentioned U.S. Pat. application with a movable safety member which, in its normal position, prevents the actuation of the release mechanism, this actuation being possible only if the operator simultaneously actuates the movable safety member.

It is clear that under these conditions the fact that the operator cannot release the apparatus unless he actuates with one hand the movable safety member and simultaneously with the other hand the release mechanism will practically eliminate any risk of accidental faulty operation as the latter would require two simultaneous wrong moves or actions.

According to a preferred form of embodiment the movable safety device according to this invention comprises a latching member adapted, in its normal position, to project into the path of an arm connected to the release mechanism, and to be moved aside under the operator's control to free the path of said arm. A resilient return member is associated with the movable safety member for automatically returning the latter to its normal position when it is not actuated by the operator.

A typical form of embodiment of the device of this invention will now be described by way of example with reference to the attached drawing, in which.

Figure 1:
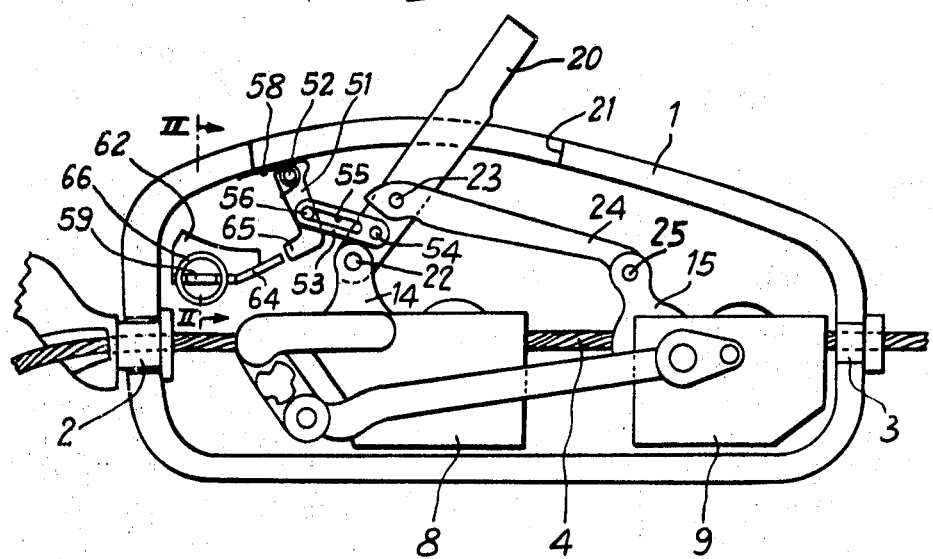
FIG. 1 is a simplified longitudinal section showing a traction and hoisting apparatus of the clamp or jaw type, equipped with the safety device of this invention, only the parts necessary for the understanding of this device being shown in the FIG.

Referring first to FIG. 1, the traction and hoisting apparatus illustrated therein is shown diagrammatically as comprising a hollow body 1 constituting a casing in which a pair of aligned sockets 2 and 3 are fitted to permit the passage of the cable or rope 4 therethrough.

This apparatus described more in detail in the above mentioned patent application comprises a control lever 20 emerging from the casing 1 through an elongated aperture 21 and pivoted on the one hand at 22 to the heads of levers 14 adapted to control the clamping action of the jaws of clamp 8, and on the other hand at 23 to an arm 24 pivoted in turn to the heads of other levers 15 controlling the clamping action of the jaws of another clamp 9.

The release or clutch mechanism of this apparatus consists of a pivoting arm 51 rigid with a transverse shaft 52 trunnioned in bearings fitted in the walls of casing 1. This arm 51 is connected to the control lever 20 via connecting links 53 pivoted at one end 54 to said lever 20 and formed at the other end with an elongated aperture 55 parallel to the axis of links 53 and adapted to guide a pin 56 engaged therein and projecting laterally from said arm 51 to permit the movement of control lever 20. The pivotal connection 54 between these links 53 and control lever 20 is located substantially halfway between the pivot points 22 and 23. One end of pivot pin 52 projects from the casing 1 and is adapted to receive a detachable control handle 57. A return spring 58 wound on the pivot pin 52 reacts with one end against the casing 1 and bears with the other end against the arm 51 for automatically urging and returning the release mechanism to its nonrelease position.

Figure 2:
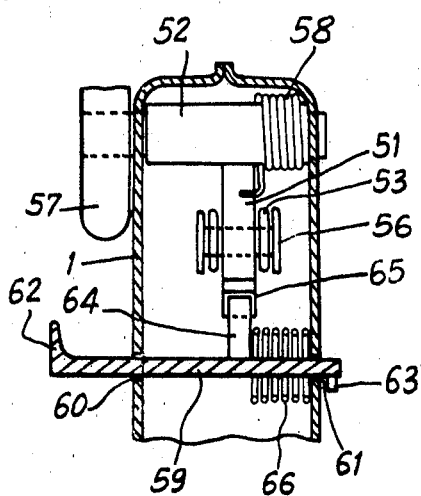
FIG. 2 is a cross section taken along the line II—II of FIG. 1 and showing on a larger scale the safety device holding the release control lever in its latched position.
Figure 3:
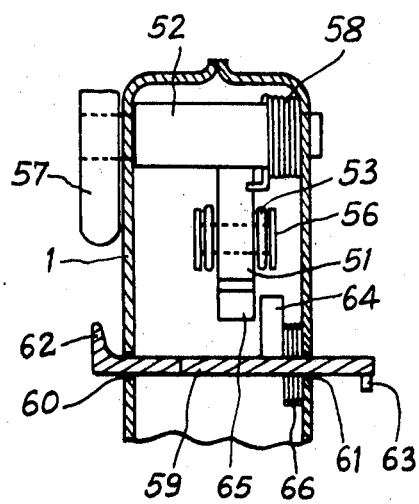
FIG. 3 is a view corresponding to FIG. 2 but showing the safety device in its release control lever unlatching position.

The movable safety member carried by the apparatus comprises a horizontal, rectangular-sectioned rod 59 extending through correspondingly-shaped aligned apertures 60, 61 formed in the casing 1; this rod 59 is adapted to slide through these apertures and carries at its end projecting from the casing on the same side as the release control lever 57 a pushbutton 62 and at the opposite end a stop member 63 secured thereto for example by means of a cross pin. The rod 59 further carries intermediate its ends an inclined projection 64 which, in the inoperative position of the safety member (FIG. 2), i.e. when the stop member 63 engages the adjacent outer wall of casing 1, is aligned with the lower bent portion 65 of arm 51, thus preventing any rotational movement of arm 51 about its pivot pin 52 when the release control handle 57 is actuated.

A coil compression spring 66 mounted on the rod 59, between the inclined projection 64 and the inner face of casing 1 which is adjacent to stop member 63, is adapted in the inoperative position to hold the inclined projection 64 in alignment with the bent end portion 65 of arm 51.

It is therefore clear that to release the apparatus the operator must simultaneously depress the pushbutton 62 with one hand against the resistance of spring 66 so as to remove the inclined projection 64 from the path of arm 51, and actuate with the other hand the release handle 57 in order to cause the pivotal movement of arm 51 and the opening of the jaws of clamps 8 and 9. This necessary simultaneous action performed by the two hands of the operator will thus safely avoid the risk of producing an untimely release of the apparatus as a consequence of an accidental actuation of the release control handle.

It will be readily understood by those conversant with the art that this description should not be construed as limiting the scope of the invention since many modifications and variations may be brought thereto without departing from the basic principles of the present invention. Thus, inter alia, the release control member may be of any other suitable and known type, and on the other hand the movable safety member may have any other suitable configuration adapted, in the inoperative position, to prevent the actuation of the aforesaid release control member.

I claim:

1. Release control device for traction and hoisting apparatus of the type comprising two clamps adapted to engage a cable or rope, comprising a manually movable release control member (51, 52, 57) and a latching element (59, 62, 64) adapted in the normal position to prevent the actuation of the release control device, characterized in that the latching element is automatically returned to its normal or latching position by means of a spring (66) and comprises actuating means which cannot be actuated by the same hand of the operator simultaneously with the release control member (57) in order that the release of the apparatus necessitates the simultaneous action of the two hands of the operator on the release control member and on the latching element.